(Model.)
2 Sheets—Sheet 1.
J. L. HALTEMAN.
FERTILIZER SOWER.
No. 261,517. Patented July 18, 1882.
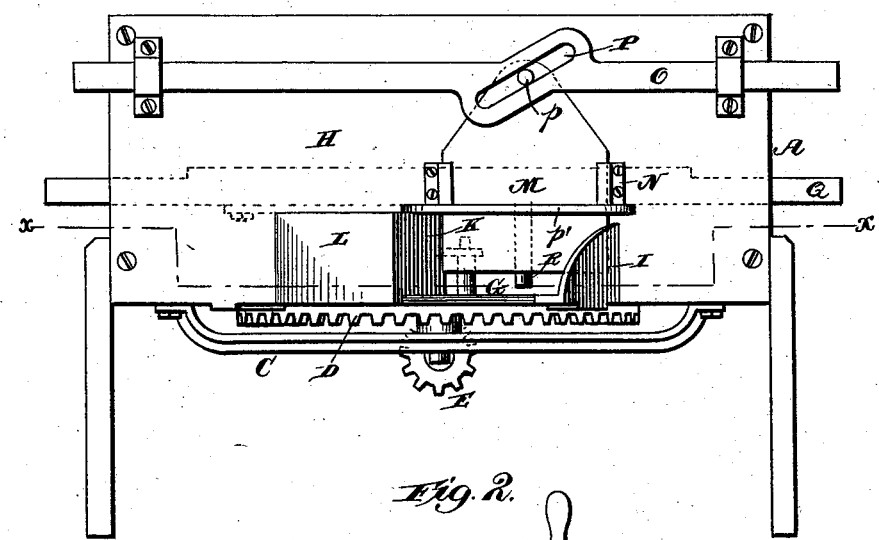
Witnesses.
Robert Everett
George Rea
Inventor:
Jacob L. Halteman.
By James L. Norris.
Atty.

(Model.)
J. L. HALTEMAN.
FERTILIZER SOWER.
No. 261,517. Patented July 18, 1882.
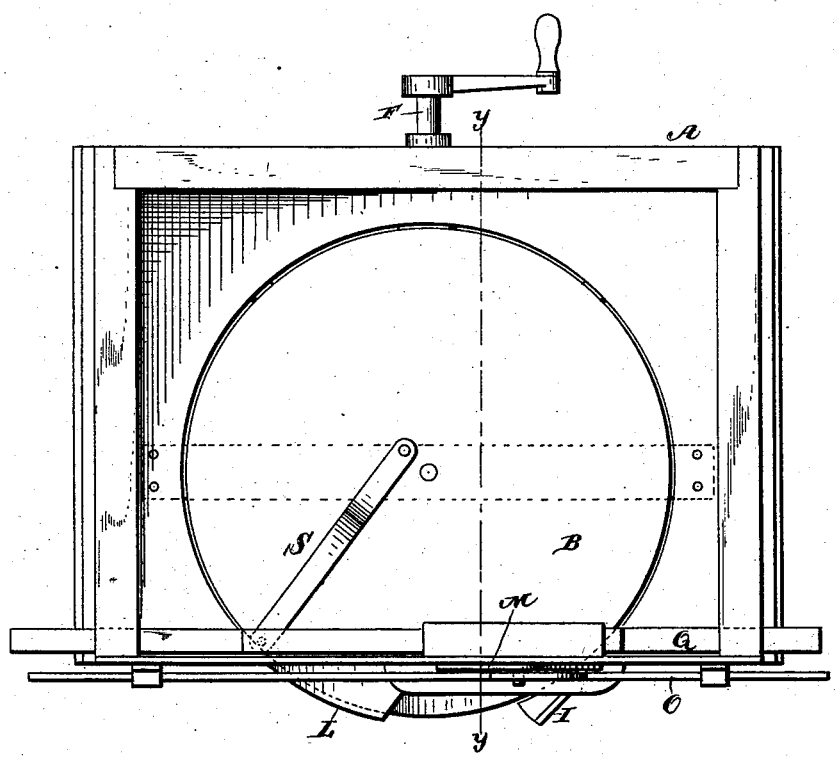
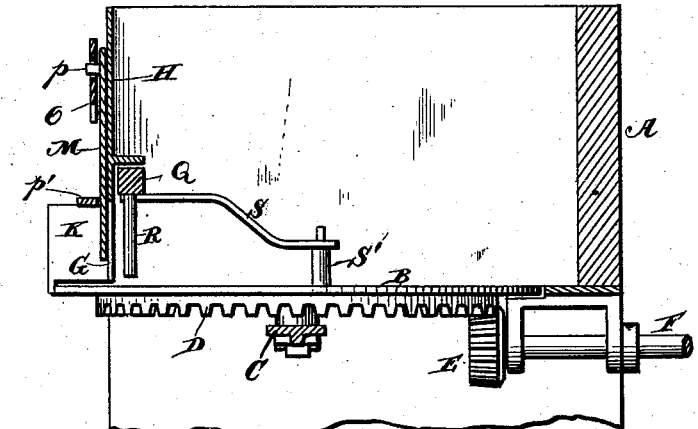
Witnesses.
Robert Everett
George Rea
Inventor.
Jacob L. Halteman.
By James L. Norris.
Atty.

United States Patent Office.

JACOB L. HALTEMAN, OF MILTON, ASSIGNOR TO THE HOOSIER DRILL COMPANY, OF RICHMOND, INDIANA.

FERTILIZER-SOWER.

SPECIFICATION forming part of Letters Patent No. 261,517, dated July 18, 1882.

Application filed June 16, 1881. (Model.)

*To all whom it may concern:*

Be it known that I, JACOB L. HALTEMAN, a citizen of the United States, residing at Milton, Wayne county, Indiana, have invented new and useful Improvements in Fertilizer-Sowers, of which the following is a specification.

This invention relates to that class of fertilizer-distributers in which a horizontal rotary disk is employed for carrying forward and discharging the fertilizing material.

The objects of my improvement are, first, to provide means for scraping the material from the rotary disk and guiding such portion of the material as may pass under the scraper back into the hopper; second, to provide an improved vertically-adjustable gate or cut-off; third, to provide a novel horizontal longitudinally-movable agitator. These objects I attain by means of the devices illustrated in the annexed drawings, in which—

Figure 1 represents a side elevation of my improved fertilizer-distributer. Fig. 2 is a section on a horizontal plane indicated by the dotted line $x\ x$, Fig. 1. Fig. 3 is a top or plan view. Fig. 4 is a section taken on a plane indicated by the dotted line $y\ y$, Fig. 3.

A indicates the hopper, having in its bottom an opening which is occupied by the horizontal and rotary plane-faced disk B, which thus constitutes a portion of the bottom of the hopper, and which is employed for feeding forward and discharging the fertilizing material. This rotary disk is provided with a spindle which is journaled in a cross bar or brace, C, extending across the hopper-bottom, and shown in dotted lines, Fig. 3. The rotary disk is driven by means of gearing actuated by the wheel or wheels of the carriage, and to such end it is provided upon its under side with a ring-gear, D, which is engaged by the driving-pinion E, fixed upon a shaft, F. The hopper is provided at one side with a rectangular discharge-opening, G, and at this side of the hopper the rotary disk projects to some extent out from the hopper-wall H, so as to come below said opening and extend beyond it. The discharge-passage is formed by a vertical plate, I, extending out from the hopper at one side of the discharge-opening, and by the vertical scraper K, which extends out from the hopper-wall at the opposite side of the said discharge-opening. The plate I and the scraper project at an angle to the hopper-wall, the latter extending tangentially across that portion of the rotary disk which projects beyond the hopper. A curved wall or extension, L, runs from the outer vertical edge of the scraper to the wall or side of the hopper and lies closely up to the periphery of the disk. This construction constitutes an extension at the side of the hopper which provides a V-shaped recess on its inner side, one part of which forms the scraper and the other the curved wall. The fertilizing material fed forward by the disk is scraped off and discharged by the scraper, and such of the material as may pass under the scraper will be guided by the curved wall into the hopper.

M indicates a vertically-movable gate or cut-off, which can be raised or lowered so as to constitute a valve for regulating the discharge. This gate works in suitable guides, N, secured to the hopper, and it is conveniently raised or lowered by means of a horizontal longitudinally-movable bar, O, having a diagonal slot, P, in which a stud, $p$, upon the gate is received. This bar can be operated in any suitable way, and from its construction it will be seen that it can be made to open any desired number of gates. A cross-bar, $p'$, also extends across the hopper in front of the gate as a further means of guiding the same. Any desired means can be employed for locking the bar after the gate has been adjusted, so that the gate can be set at any desired height.

To agitate, stir up, separate, and assist in the feed of fertilizing material, I provide a horizontal longitudinally-movable agitator, Q, consisting of a bar working in suitable guides in the sides of the hopper, and provided with one or more teeth, R, located so as to come alongside of the discharge-opening. In order to impart a reciprocating motion to this agitator, I pivot the inner end of a pitman, S, to a crank-pin, S', that is fixed eccentrically on the top face of the rotary feed-disk, and also pivotally connect the outer end of said pitman to the reciprocating agitator. Hence as the feed-disk is rotated the agitator will be reciprocated, thus agitating the fertilizer and keeping it in front of the discharge-opening. Other analogous means, however, can be employed for reciprocating the agitator.

Having thus described my invention, what I claim is—

1. The combination, in a fertilizer-distributer, of the plane-faced horizontal rotary disk at the bottom of the hopper with an angular extension projecting rearwardly from the hopper at one side of the discharge-orifice, said extension forming the tangential scraper for the rotary plate and the curved wall for guiding into the hopper such material as passes under the scraper, substantially as described.

2. The combination, in a fertilizer-distributer, of the plane-faced horizontal rotary disk at the bottom of the hopper with an angular rearward extension of the hopper, said extension being closed at its top and forming the tangential scraper K for the rotary disk, and the curved wall L, which extends over the periphery of the disk, substantially as and for the purposes described.

3. The combination, in a fertilizer-distributer, of the hopper having a plane-faced rotary disk located in its bottom, and extended under the discharge-opening and beyond the side of the hopper, with the discharge-passage formed by the plate I and scraper K, and the vertically-movable gate located to open or close the discharge-opening, and the horizontal longitudinally-movable bar for operating the gate, having an oblique slot, in which a stud on the gate is received, substantially as described.

4. The combination, with the hopper having a horizontal plane-faced rotary disk for feeding forward the fertilizing material, of the horizontal longitudinally-movable agitator Q, consisting of a horizontal bar provided with one or more teeth located over the disk and alongside of the discharge-opening, substantially as described.

5. The combination of the reciprocating agitator Q, pitman S, rotating-plate B, and stud S', substantially as and for the purpose specified.

In testimony whereof I have hereunto set my hand in the presence of two subscribing witnesses.

JACOB L. HALTEMAN.

Witnesses:
D. HOCH, Jr.,
W. J. CALLAWAY.